(12) United States Patent
Smith et al.

(10) Patent No.: US 8,478,977 B1
(45) Date of Patent: Jul. 2, 2013

(54) SECURE AUTO-MIGRATION PROGRAM

(75) Inventors: Ronald P. Smith, Cupertino, CA (US);
Carl T. Smith, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1694 days.

(21) Appl. No.: 11/315,024

(22) Filed: Dec. 21, 2005

(51) Int. Cl.
*G06F 1/24* (2006.01)

(52) U.S. Cl.
USPC ............ 713/100; 713/187; 709/221; 709/226

(58) Field of Classification Search
USPC .......................................................... 726/15
See application file for complete search history.

(56) References Cited

U.S. PATENT DOCUMENTS

| | | | |
|---|---|---|---|
| 6,243,815 B1 * | 6/2001 | Antur et al. ...................... 726/11 |
| 6,804,777 B2 * | 10/2004 | Hollis et al. .................. 713/170 |
| 6,990,592 B2 * | 1/2006 | Richmond et al. .............. 726/15 |
| 7,055,171 B1 * | 5/2006 | Martin et al. ...................... 726/3 |
| 7,131,141 B1 * | 10/2006 | Blewett et al. .................. 726/12 |
| 7,305,459 B2 * | 12/2007 | Klemba et al. ................. 709/220 |
| 7,475,076 B1 * | 1/2009 | Shmuylovich et al. ........ 709/223 |
| 7,593,324 B2 * | 9/2009 | Jain et al. ...................... 370/227 |
| 7,636,333 B2 * | 12/2009 | Jothipragasam .............. 370/329 |
| 7,697,419 B1 * | 4/2010 | Donthi .......................... 370/220 |
| 7,823,167 B2 * | 10/2010 | Makagon et al. ............. 719/328 |
| 2002/0078076 A1 * | 6/2002 | Evans ........................... 707/204 |
| 2003/0055968 A1 * | 3/2003 | Hochmuth et al. ........... 709/226 |
| 2003/0208587 A1 * | 11/2003 | Sauer ............................ 709/223 |
| 2006/0242320 A1 * | 10/2006 | Nettle et al. .................. 709/245 |
| 2007/0097998 A1 * | 5/2007 | Raikar .......................... 370/409 |

* cited by examiner

Primary Examiner — Amare F Tabor
(74) Attorney, Agent, or Firm — Kenyon & Kenyon LLP

(57) ABSTRACT

A system and method for securely and automatically moving a resource, such as a server, between secure network environments include a secure auto-migration control program. The secure auto-migration program may automatically reconfigure a computing resource used in a first secure network environment to be used in a second secure network environment and logically move the computer resource from the first secure network environment to the second secure network environment.

14 Claims, 5 Drawing Sheets

SECURE AUTO-MIGRATION PROGRAM

BACKGROUND OF THE INVENTION

The present invention relates generally to the allocation of resources and, more specifically, to the transfer of resources between environments.

Design and development projects often require a great deal of computing resources, such as servers. These computing resources are typically allocated to one specific project task at a time. Once complete, these computing resources need to be reconfigured for the new environment. This is a tedious, error prone, time-consuming process. This process becomes especially important when the environments using the computing resources contain potentially competing customer intellectual property data, such as any proprietary data or trade secrets.

Previous approaches have been procedure driven manual processes which often resulted in time consuming problem resolution due to human error. The resource manager or project manager would decide that the computing resource is to be transferred from a first environment to a second environment. The system manager would cleanse the computing resource of any previous intellectual property left over from the previous project. The system manager would then configure the computing resource to operate in the environment of the new project, such as the local area network for the project. A network engineer would transfer the computing resource to the environment of the new project. A mistake by any one of these individuals could lead to delays, disclosure of confidential information, and damage to the project system. A controllable, repeatable process which eliminates many of the human error issues typically associated with the re-imaging process would be beneficial.

BRIEF SUMMARY OF THE INVENTION

A system and method for securely and automatically moving a resource, such as a server, between secure network environments is disclosed. A secure auto-migration control program may automatically reconfigure a computing resource used in a first secure network environment to be used in a second secure network environment and logically move the computer resource from the first secure network environment to the second secure network environment.

DETAILED DESCRIPTION

A system and method for securely and automatically moving a resource, such as a server, between secure network environments is disclosed. In response to a command from a user, a secure auto-migration control (SAMC) program may automatically reconfigure a computing resource used in a first secure network environment to be used in a second secure network environment and may logically move the computer resource from the first secure network environment to the second secure network environment.

These secure network environments allow multiple parties to work together through a design or project lifecycle without fear of compromising each party's security. The secure network environments, in this context, may facilitate such features as project collaboration (e.g., design, development, or other joint effort to produce a work product) using a combination of network architecture, security processes, and working tools and applications, which collectively are flexible enough to support different use models and adapt to changes during a project lifecycle. Alternatively, these secure network environments may be as simple as a local area network that is kept secure from unauthorized outside access.

Use of the secure network environment allows developers from all of the participating parties to access the design environment in each of these phases, while allowing each party to maintain proper security from the outside and to control access to the project resources within each party at each phase of the project. At the same time, the secure network environment protects sensitive data (such as proprietary information, software tools, designs and intellectual property), while still allowing multiple parties to interact and collaborate on a project.

Figure 1:
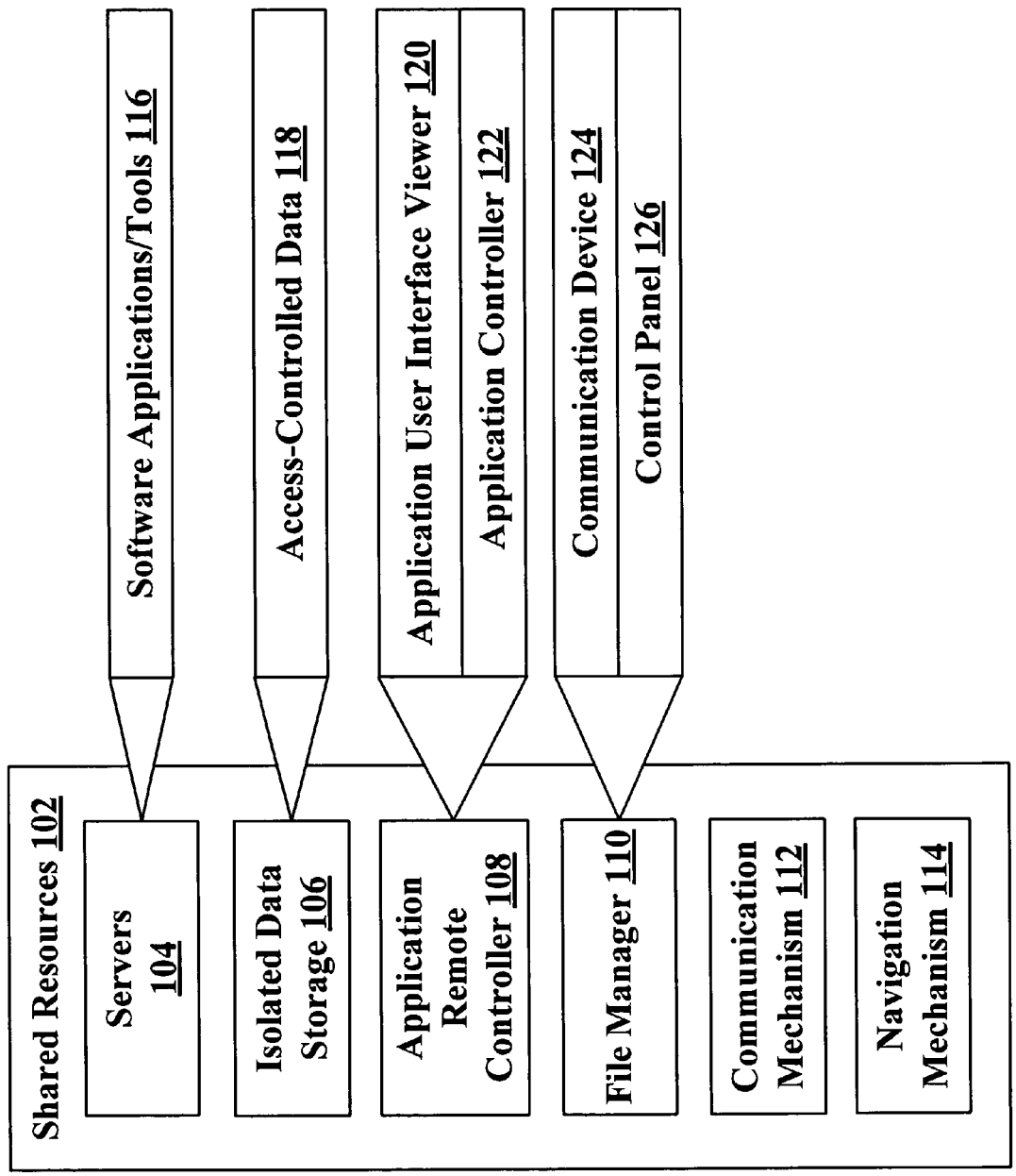
FIG. 1 illustrates in a block diagram one embodiment of a set of resources constituent to a secure network environment.

FIG. 1 is a block diagram illustrating shared resources 102 constituent to a secure network environment, according to embodiments of the invention. In one embodiment, the shared resources 102 may include one or more of the following: one or more servers 104, an isolated data storage device 106, an application remote controller 108, a file manager 110, a communication mechanism 112, and a navigation mechanism 114.

Each server 104 is a node in the local area network (LAN) of the secure network environment. The server 104 is configured to execute a set of software applications 116 for performing the project work tasks. Access to the server 104 may require a separate log-in authorization procedure. The software applications 116 may be stored on server 104, or may be accessed by server 104 if stored remotely. The software applications 116 may include any software that parties may want to employ in the secure network environment, to facilitate the collaboration and completion of the tasks at hand. The software applications 116 may include, without limitation, design/development/engineering software (e.g., CAD/CAE graphical tools), electronic design automation software, emulation software, etc. Additionally, the server 104 or some other platform may run the application remote controller 108, the file manager 110, and the communication mechanism 112 for use in the secure network environment. In one embodiment, the secure network environment architecture includes a server 104 at each party site. The software applications 116 may be executed on any of the multiple servers 104.

The isolated data storage device 106, which may be coupled to and accessible by a server 104, may be used to securely store access-controlled project data 118. The isolated data storage device 106 may be a portion of a larger data storage device or network, such as a disk collection, tape drive, or storage area network, partitioned on a per project basis. Additionally, the isolated data storage 106 may be linked to the secure network environment through a secured subnet. In one embodiment, access to the data stored on data storage 106 is through a data authorization mechanism. For example, a separate log-in authorization procedure may be required to export data from the data storage 106 to the server 104, thus providing another layer of security to the data.

The application remote controller 108 may be used to perform a number of functions remotely. For instance, via the application remote controller 108, the user may view a respective application user interface of one or more applications from the set of software applications 116, as the one or more applications are executing, with an application user interface viewer 120. A first user may use the application user interface viewer 120 to "shadow" a second user's interaction with one or more applications from the set of software applications 116. Further, an application controller 122 may be used to control execution of one or more applications from the set of software applications 116. According to one embodiment, the application remote controller 108 provides the capability to remotely view a graphical user interface that displays a graphical representation. To provide maximum collaboration functionality, application remote controller 108 may be configured on each server 104 within the secure network environment, thus providing equivalent capabilities to all collaboration parties.

The file manager 110 provides a virtual file system common to all parties using the secure network environment. The file manager 110 may be configured to manage shared data files, such as access-controlled data 116 from isolated data storage 106. In one multiple server embodiment, file manager 110 is configured on all servers 104 of the secure network environment, so that all parties can retrieve synchronized files, revise them if necessary, and save them. The file manager 110 provides a document control mechanism that enables parties to know what data has been imported from isolated data storage 106 and ensures that various copies of a file are kept in version synchronization. File manager 110 also provides monitoring of document retrievals. The file manager 110 may include a 124 at each party site and a control panel 126 at one party site.

The communication mechanism 112 may be configured to receive, store, and retrieve messages, textual or otherwise, from users who are authorized to access and work in the secure network environment. The communication mechanism 112 facilitates the discussion of issues in a common location, thereby enhancing the quality of the collaboration.

The navigation mechanism 114 may guide the authorized users through the secure network environment. The navigation mechanism 114 may assist in navigating through the secure network environment to locate and access particular resources of the shared resources 104. Furthermore, the navigation mechanism 114 may provide the capability to see which applications are currently being used and the status of equipment within the secure network environment.

With the inclusion of the SAMC program, these resources may be added to the secure network environment with relative ease. The new resources may be surplus or inactive resources currently assigned to a different secure network environments. The new resources may be added or removed to the secure network environments.

Figure 2:
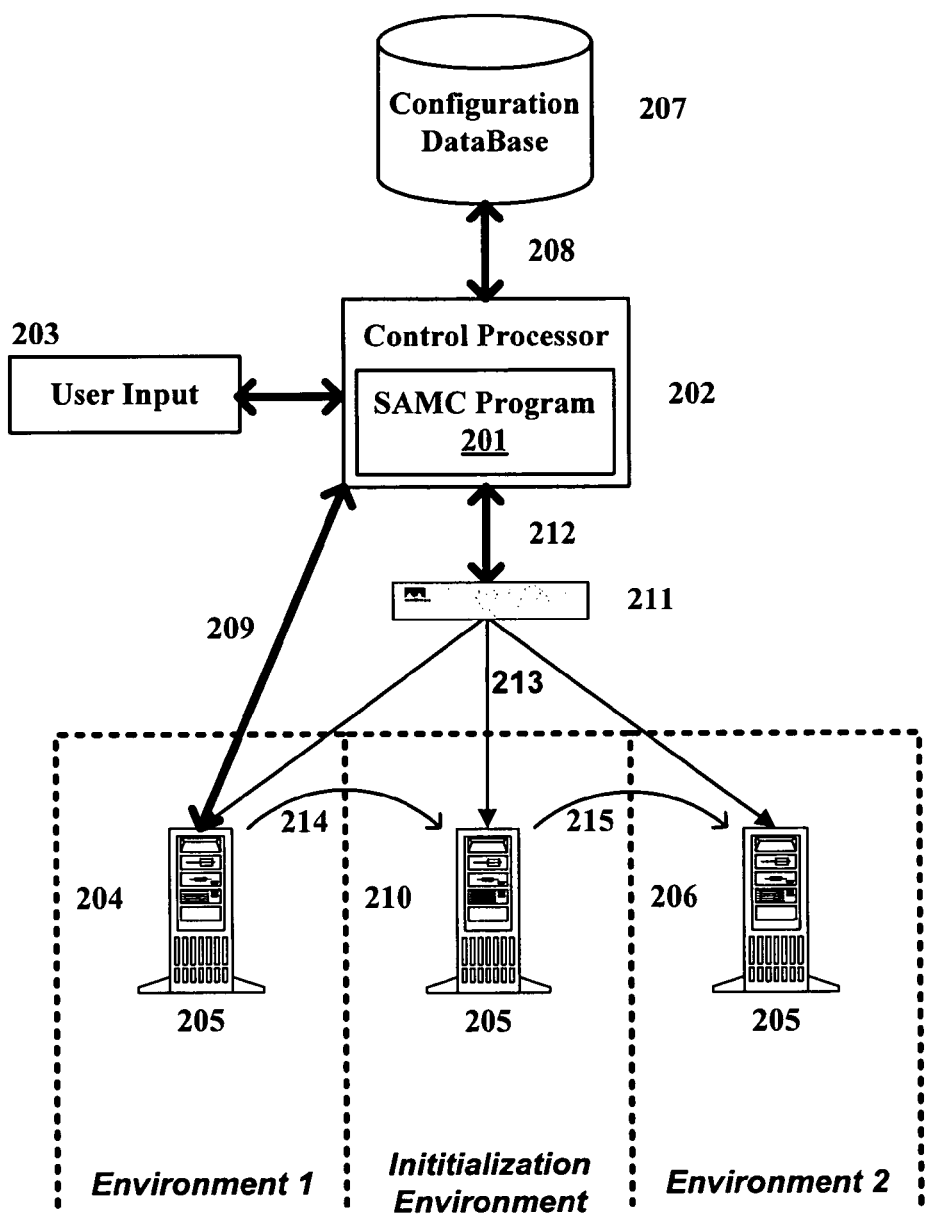
FIG. 2 illustrates in a block diagram one embodiment of a secure auto-migration control program and its interaction with the secure network environment.

FIG. 2 illustrates in a block diagram one embodiment of a SAMC program 201 and its interaction with the secure network environment. The SAMC program 201, which in one embodiment may be a UNIX or Linux based program written using Perl and/or Tcl programming languages or, in an alternate embodiment, may be written using a proprietary software language, is a master program executed by a control processor 202 that takes a source designator and a destination designator as part of a user command. The user command may be received as an input from a user interface 203. The source designator indicates the location 204 of a resource 205, such as a server, to be transferred to a location 206 in an environment indicated by the destination designator. For example, the source designator may be a Cluster Designator letter or a server number.

The SAMC program 201 may query a configuration database 207 via a connection path 208 to determine the current location 204 and status of the resource 205. The SAMC program 201 may then log in to the resource 205 via a control path 209 to query about resource activity, to ensure that no processes are running. Once inactivity has been confirmed, the SAMC program 201 updates the required configuration for an initialization environment 210, and restarts the resource 205. The SAMC program 201 may then access a network switch 211 via a control channel 212. The network switch 211 is the switch used to control the virtual LAN (VLAN) of the secure network environment. Once access to the network switch is established, a port location 213 of the resource Ethernet port will be verified. If network switch parameters match the configuration database 207, then the network switch 211 parameters will be modified to logically move 214 the resource 205 to the initialization environment 210.

Once the resource 205 has been rebooted and has established connectivity in the initialization environment 210, the SAMC program 201 will determine which operating system is required for the resource 205 from the configuration database 207, and re-initialize the resource 205 disk drive and cache to assure that there is no remaining data on the resource 205, particularly sensitive data such as proprietary information or intellectual property. After the initialization of the resource 205 is complete, the resource will again be accessed through the control path 209. Once inactivity has been confirmed, the SAMC program 201 updates the required configuration for the destination environment 206, and restarts the resource 205. The SAMC program 201 may then access the network switch 211 via the control channel 212. Once access to the network switch 211 is established, the port location 213 of the resource 205 Ethernet port may be verified. If network switch 211 parameters match the configuration database 207, then the network switch 211 parameters may be modified to logically move 215 the resource 205 to the destination environment 206. Once the resource 205 is successfully moved to the destination environment 206, the SAMC program 201 may update the configuration database 207 and send notification to the managers of the environment.

Figure 3A:
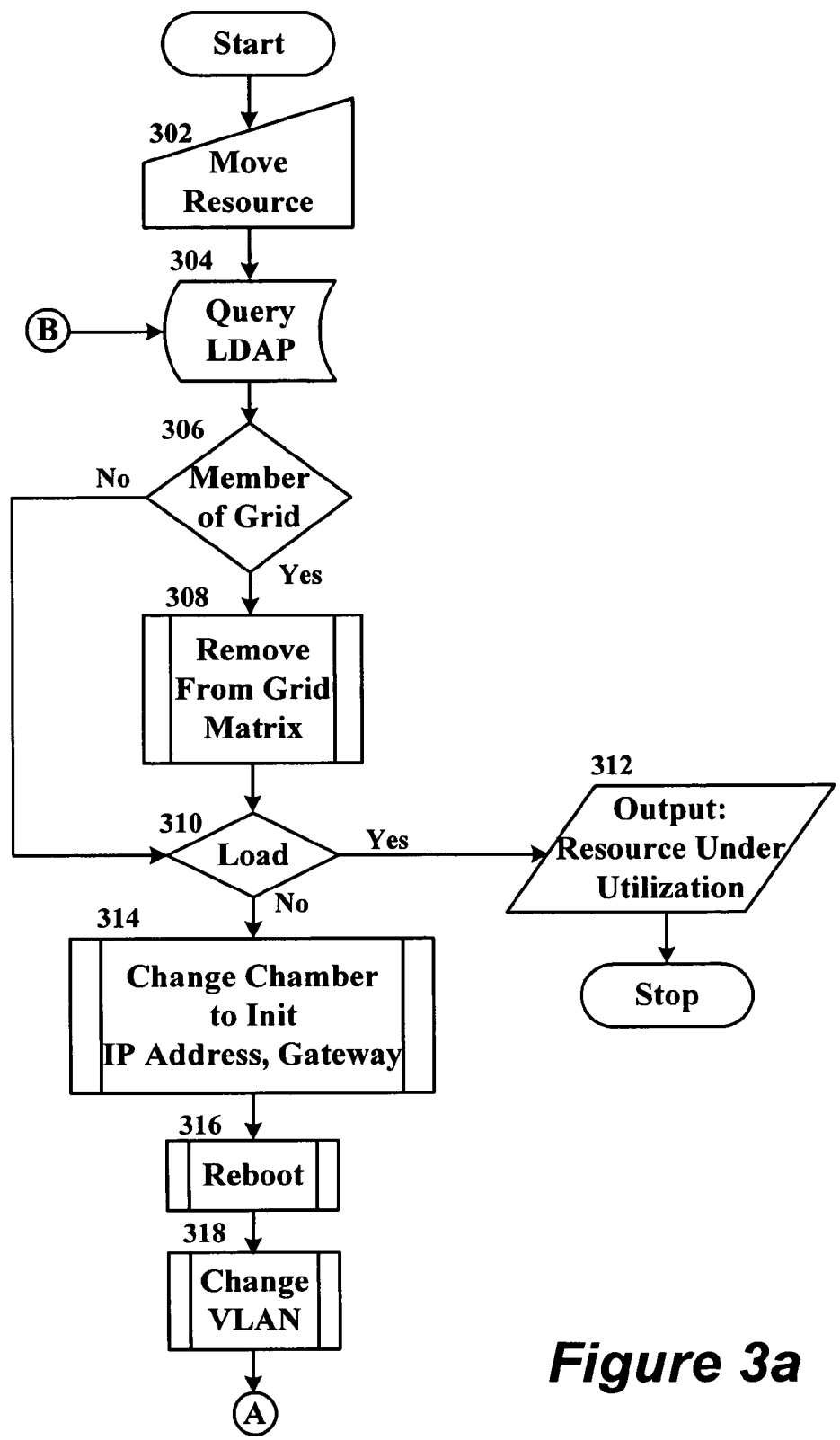
FIGS. 3a-b illustrate in a flow chart one embodiment of a method for performing secure auto-migration.
Figure 3B:
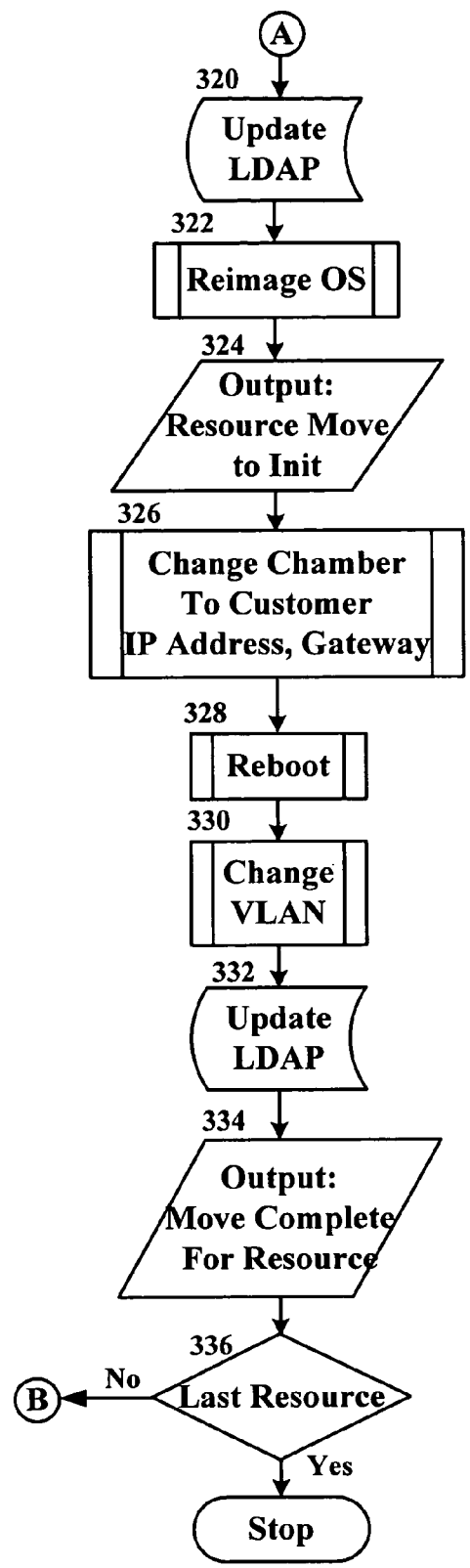

A SAMC program may be any program that automatically reconfigures a computing resource for switching between secure network environments and logically moves the computer resource between secure network environments. In one embodiment, the SAMC program performs these functions by executing the method illustrated in the flowchart of FIGS. 3*a-b*. The SAMC program receives a command to move a resource 205, such as a server or a cluster (Block 302). The SAMC program queries a lightweight directory access protocol (LDAP) (Block 304). If the resource 205 is a member of a grid (Block 306), then the resource is removed from the Grid Matrix environment (Block 308). Otherwise, if the resource 205 has a load present (Block 310), then a message is outputted to the user indicating that the resource 205 is being utilized (Block 312) and the process is cancelled. If no load is present on the resource (Block 310), the resource 205 is logically moved to the initialization environment, including changing the IP address and gateway to match the initialization environment (Block 314). The resource is rebooted (Block 316), the virtual local area network is changed (Block 318), and the LDAP is updated to reflect the new location of the resource 205 (Block 320). The SAMC program reimages the operating system (OS) of the resource 205 (Block 322). A message is outputted to the user indicating that the resource 205 has been moved to the initialization environment (Block 324). The resource 205 is logically moved to the destination environment, including changing the IP address and gateway to match the new environment (Block 326). The resource is rebooted (Block 328), the VLAN is changed to register the inclusion of the new resource (Block 330), and the LDAP is updated to reflect the new location of the resource 205 (Block 332). A message is outputted to the user indicating that the move is complete for that resource 205 (Block 334). If that is the last resource to be moved (Block 336), then the process is over. Otherwise, the LDAP is queried again (Block 304), and the process is repeated.

Figure 4:
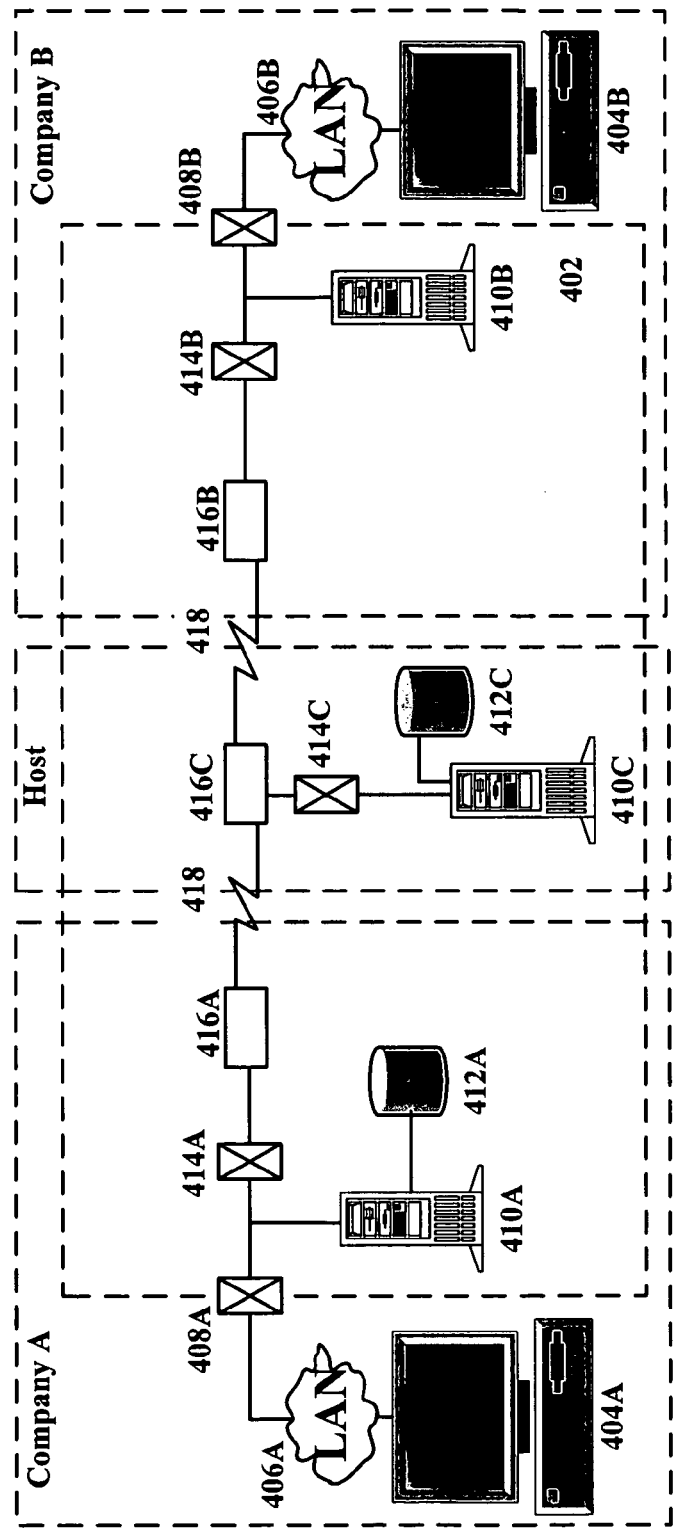
FIG. 4 illustrates in a diagram one embodiment of an example architecture for a virtual collaboration environment.

One secure network environment that may implement the secure auto-migration control program is a virtual collaboration environment. FIG. 4 illustrates the virtual collaboration environment by depicting a two-party virtual collaboration environment 402, in this example Company A and Company B, although multiple parties may be involved. Each party uses a client machine 404 (e.g., a conventional computer) and a local area network (LAN) 406, as an access mechanism to the environment 402. The client machine 404 may be in a physically protected location on the party premises or may access the LAN 406 via the Internet or a dial-in connection. A firewall 408 provides the entrance point to the environment 402, and in this example provides the functionality of the access control mechanism 106. Once a user accesses the environment 402 through firewall 408, the user has access to a respective local server 410 on which they can use tools (e.g., software applications) to perform work tasks. Access to the server 410 may require an additional log-in and authorization procedure. In addition, the user may gain access to data on a data storage 412, which may be further protected by an additional log-in and authorization procedure.

In order to collaborate with the other party, a user needs to get through a second firewall 414 to access a secure network connection. To establish and access the secure network connection, the user needs to establish a secure association via a virtual private network (VPN) switch 416, upon which a connection 418 is established, such as a virtual point-to-point network connection. Once the connection 418 is established, the user can begin to collaborate with the other party, including transmission and reception of encrypted data through the connection 418. The user may also then access the resources, such as the server 410 and data storage 412 that the other party has made available to the virtual collaboration environment 402.

As can be seen from FIG. 4, in one embodiment, a party not involved in the project for which the virtual collaboration environment was created may act as a neutral host of that virtual collaboration environment. The neutral host may provide some of the resources, such as servers 410C and data storage 412C, used in the virtual collaboration environment 402. Alternatively, the virtual collaboration environment 402 may be supported by the collaborating parties without the neutral host hardware present. A neutral host may provide additional hardware to a virtual collaboration environment 402, where the parties were providing their own hardware initially.

In the above description, for purposes of explanation, numerous specific details are set forth in order to provide a thorough understanding of the present invention. It will be apparent, however, to one skilled in the art that the present invention can be practiced without these specific details.

What is claimed is:

1. A method comprising:
   automatically reconfiguring a shared programmable resource used in a first secure network environment, to be used in a second secure network environment, with a secure auto-migration control program executed by a hardware processor;
   confirming the shared programmable resource is inactive prior to reconfiguring the shared programmable resource to the second secure network environment; and
   automatically and logically moving the shared programmable resource from the first secure network environment to the second secure network environment with the secure auto-migration control program executed by the processor;
   wherein said moving includes:
      automatically removing sensitive data from the shared programmable resource; and modifying a parameter in a network switch.

2. The method of claim 1, wherein automatically and logically moving the shared programmable resource from the first secure network environment to the second secure network environment comprises:
   logically moving the shared programmable resource from the first secure network environment to an initialization environment;
   performing initialization on the shared programmable resource to prepare the shared resource for the second secure network environment; and
   logically moving the shared programmable resource from the initialization environment to the second secure network environment.

3. The method of claim 2, further comprising:
   automatically updating a configuration database to reflect the shared programmable resource being in the second secure network environment.

4. The method of claim 3, further comprising:
   updating the configuration database to reflect the shared programmable resource being in the initialization environment.

5. The method of claim 1, wherein the shared programmable resource is moved from the first secure network environment to the second secure network environment via a switch.

6. The method of claim 1, wherein the shared programmable resource is one of servers, data storage, application remote controllers, file managers, communication mechanisms, and navigation mechanisms.

7. A system comprising:
   a hardware processor to execute a secure auto-migration control program to automatically reconfigure a shared programmable resource, used in a first secure network environment, to be used in a second secure network environment, and to automatically and logically move the shared programmable resource from the first secure network environment to the second secure network environment, wherein to logically move the shared programmable resource,
   wherein the secure auto-migration control program confirms the shared programmable resource is inactive prior to reconfiguring the shared programmable resource to the second secure network environment, automatically removes sensitive data from the shared programmable resource and modifies a parameter in a network switch.

8. The system of claim 7, wherein the secure auto-migration control program logically moves the shared programmable resource from the first secure network environment to the second secure network environment via an initialization environment to perform initialization on the shared programmable resource in preparation for the second secure network environment.

9. The system of claim 7, further comprising:
a configuration database to track in which secure network environment the shared programmable resource resides.

10. The system of claim 7, further comprising:
a switch to move the shared programmable resource from the first secure network environment to the second secure network environment.

11. The system of claim 7, wherein the shared programmable resource is one of servers, data storage, application remote controllers, file managers, communication mechanisms, and navigation mechanisms.

12. A method comprising:
creating a first secure network environment with a first plurality of shared resources and a second secure network environment with a second plurality of shared resources;
determining that the second plurality of shared resources is insufficient;
automatically reconfiguring a shared programmable resource, used in a first secure network environment, to be used in a second secure network environment, with a secure auto-migration control program executed by a hardware processor;
confirming the shared programmable resource is inactive prior to reconfiguring the shared programmable resource to the second secure network environment; and
automatically and logically moving the shared resource from the first secure network environment to the second secure network environment with the secure auto-migration control program executed by the processor;
wherein said moving includes:
automatically removing sensitive data from the shared programmable resource; and modifying a parameter in a network switch.

13. The method of claim 12, wherein automatically and logically moving the shared programmable resource from the first secure network environment to the second secure network environment comprises:
logically moving the shared programmable resource from the first secure network environment to an initialization environment;
performing initialization on the shared programmable resource to prepare the shared programmable resource for the second secure network environment; and
logically moving the shared programmable resource from the initialization environment to the second secure network environment.

14. The method of claim 12, further comprising:
automatically updating a configuration database to reflect the shared programmable resource being in the second secure network environment.

\* \* \* \* \*